United States Patent
Hisanaga

(10) Patent No.: US 12,516,189 B2
(45) Date of Patent: Jan. 6, 2026

(54) CURABLE RESIN COMPOSITION, PRODUCTION METHOD THEREOF AND CURED PRODUCT

(71) Applicant: THREEBOND CO., LTD., Tokyo (JP)

(72) Inventor: Takuya Hisanaga, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 889 days.

(21) Appl. No.: 17/781,993

(22) PCT Filed: Nov. 24, 2020

(86) PCT No.: PCT/JP2020/043634
§ 371 (c)(1),
(2) Date: Jun. 2, 2022

(87) PCT Pub. No.: WO2021/117476
PCT Pub. Date: Jun. 17, 2021

(65) Prior Publication Data
US 2023/0002609 A1  Jan. 5, 2023

(30) Foreign Application Priority Data

Dec. 11, 2019 (JP) .................................. 2019-223576

(51) Int. Cl.
*C08L 63/00* (2006.01)

(52) U.S. Cl.
CPC .................................. *C08L 63/00* (2013.01)

(58) Field of Classification Search
CPC ....................................................... C08L 63/00
See application file for complete search history.

(56) References Cited

U.S. PATENT DOCUMENTS

| 2009/0171025 A1* | 7/2009 | Matsushita | C08K 5/3462 525/477 |
| 2009/0269504 A1 | 10/2009 | Liao | |
| 2010/0137488 A1 | 6/2010 | Kitamura et al. | |

FOREIGN PATENT DOCUMENTS

| CN | 106566451 A | | 4/2017 |
| JP | H09-249735 A | | 9/1997 |
| JP | H1150006 A | * | 2/1999 |
| JP | 2002-088267 A | | 3/2002 |
| JP | 2007-99806 A | | 4/2007 |
| JP | 2009-127043 A | | 6/2009 |
| JP | 2011-518666 A | | 6/2011 |
| JP | 2013-124324 A | | 6/2013 |
| WO | 2007123231 A1 | | 11/2007 |
| WO | 2011125636 A1 | | 10/2011 |

OTHER PUBLICATIONS

English Translation of JP2007099806 (Year: 2007).*
English Translation of JPH1150006 (Year: 1999).*
Ancamine K54 datasheet (Year: 2024).*
Epicoat 828 datasheet (Year: 2012).*
International Search Report for the corresponding patent application No. PCT/JP2020/043634, dated Jan. 26, 2021, with English translation.
Office Action dated Nov. 21, 2022 for the corresponding Chinese patent application No. 202080085142.6, with English translation.

* cited by examiner

*Primary Examiner* — Catherine S Branch
*Assistant Examiner* — Andrea Wu
(74) *Attorney, Agent, or Firm* — LUCAS & MERCANTI, LLP

(57) ABSTRACT

The present invention provides a curable resin composition excellent in surface curability and internal curability in bonding adherend members without use of an organic tin catalyst. The curable resin composition includes the following components (A) to (E): component (A): an epoxy resin having 2 or more epoxy groups in a molecule; component (B): a bismuth catalyst; component (C): water having a pH of 8.0 or more; component (D): an organic polymer having 2 or more hydrolyzable silyl groups in a molecule; and component (E): a curing agent for an epoxy resin.

20 Claims, No Drawings

CURABLE RESIN COMPOSITION, PRODUCTION METHOD THEREOF AND CURED PRODUCT

CROSS REFERENCE TO RELATED APPLICATION

This Application is a 371 of PCT/JP2020/043634 filed on Nov. 24, 2020 which, in turn, claimed the priority of Japanese Patent Application No. 2019-223576 filed on Dec. 11, 2019, both applications are incorporated herein by reference.

TECHNICAL FIELD

The present invention relates to a curable resin composition excellent in curability without use of an organic tin catalyst, a production method thereof and a cured product.

BACKGROUND ART

An epoxy resin is excellent in adhesive strength, sealing properties, high strength, heat resistance, electrical properties, and chemical resistance. Accordingly, an epoxy resin has been used in various applications such as an adhesive, an encapsulant, a sealant, a potting agent, a coating agent, and an electrically conductive paste. However, the cured product of such an epoxy resin may have poor flexibility, though exhibiting tough mechanical strength. As a result, a cured product of epoxy resin may not follow the movement of an adherend so as to cause cracks, peeling and the like.

Accordingly, in order to impart flexibility to an epoxy resin, a modified silicone resin has been added. As an example of such a technique, an adhesive including a liquid A with a composition of an epoxy resin, a curing catalyst for modified silicone-based polymers and a filler, and a liquid B with a composition of a modified silicone-based polymer having an alkoxysilyl group at an end and a curing agent for an epoxy resin is disclosed in Japanese Patent Laid-Open No. 2007-099806.

SUMMARY OF INVENTION

However, the curable resin composition disclosed in Japanese Patent Laid-Open No. 2007-099806 uses an organic tin catalyst as curing catalyst for modified silicone-based polymers (curing agent for modified silicone resin). A tin catalyst is problematic because of the harmful effect on human body due to high toxicity, and therefore the use thereof tends to be restricted in many countries. Accordingly, a substitute catalyst for organic tin catalyst is strongly required.

Examples of the substitute catalyst for organic tin include a titanium catalyst. However, as a result of investigation, the present inventors have found that a curable resin composition with use of a titanium catalyst has a problem of poor surface curability and poor internal curability in bonding adherend members as shown in Comparative Example 5 described later in the present specification. The problem of internal curability in bonding adherend members is as follows. In the case where substrates having a large area are bonded to each other with a moisture curable resin composition, the moisture curable resin composition in a circumferential portion in contact with moisture-containing air is cured in advance. Since the cured product blocks the moisture from penetrating into the central uncured portion, a lot of time is required to cure the moisture curable resin composition in the central portion.

Accordingly, an object of the present invention is to provide a curable resin composition excellent in surface curability and internal curability in bonding adherend members without use of an organic tin catalyst.

The gist of the present invention is described as follows. The present invention overcomes at least one of the problems of a conventional curable resin composition containing an epoxy resin, a modified silicone-based polymer, and a titanium catalyst.

An embodiment of the present invention relates to the following [1]:

[1] A curable resin composition comprising the following components (A) to (E):
component (A): an epoxy resin having 2 or more epoxy groups in a molecule;
component (B): a bismuth catalyst;
component (C): water having a pH of 8.0 or more (i.e., water-containing liquid having a pH of 8.0 or more);
component (D): an organic polymer having 2 or more hydrolyzable silyl groups in a molecule; and
component (E): a curing agent for an epoxy resin.

Further, non-restrictive examples of the preferred embodiments of the present invention include the following embodiments according to the following [2] to [11-2]:

[2] The curable resin composition according to [1], wherein the component (C) is an alkaline electrolyzed water;

[3] The curable resin composition according to [1] or [2], wherein the component (C) is water containing at least one or more compounds selected from the group consisting of sodium hydroxide, calcium hydroxide, potassium carbonate and sodium metasilicate;

[4] The curable resin composition according to any one of [1] to [3], wherein the component (B) is bismuth carboxylate;

[5] The curable resin composition according to any one of [1] to [4], comprising 0.05 to 30 parts by mass of the component (C) based on 100 parts by mass of the component (A);

[6] The curable resin composition according to any one of [1] to [5], wherein the component (E) is an amine compound in a liquid state at 25° C.;

[7] The curable resin composition according to any one of [1] to [6], further comprising a filler as component (F);

[8] The curable resin composition according to any one of [1] to [7], being a cold-curing resin composition;

[9] The curable resin composition according to any one of [1] to [8], being a two-component curable resin composition;

[10] The curable resin composition according to [9], wherein the two-component curable resin composition contains an agent A and an agent B, the agent A contains the components (A) to (C), and the agent B contains the components (D) and (E);

[10-2] The curable resin composition according to any one of [1] to [10], containing substantially no organic tin catalyst;

[10-3] The curable resin composition according to any one of [1] to [10-2], wherein the component (A) is at least one selected from the group consisting of a bisphenol A epoxy resin, a bisphenol F epoxy resin, a bisphenol E epoxy resin, a diglycidyl ether of bisphenol A alkylene oxide adduct, a diglycidyl ether of bisphenol F alkylene oxide adduct, and a bisphenol E alkylene oxide adduct;

[10-4] The curable resin composition according to any one of [1] to [10-3], wherein a hydrolyzable group included in the hydrolyzable silyl group is at least one selected from the group consisting of a halogen atom, an alkoxy group, an acyl oxide group, a ketoxymate group, an amino group, an amide group, an acid amide group, an amino oxy group, a mercapto group, and alkenyl oxide group;

[10-5] The curable resin composition according to any one of [1] to [10-4], wherein the hydrolyzable silyl group is at least one selected from the group consisting of a trimethoxysilyl group, a triethoxysilyl group, a triisopropoxysilyl group, a triphenoxysilyl group, a methyldimethoxysilyl group, a methyldiethoxysilyl group, a dimethylmethoxysilyl group, and a dimethylethoxysilyl group;

[10-6] The curable resin composition according to any one of [1] to [10-5], wherein the component (D) has at least one structure selected from the group consisting of a polyoxyalkylene, a polyester, a polycarbonate, a polyurethane, a polyurea, a polyimide, a polyethylene, a polypropylene, a polyisobutylene, a poly(meth)acrylate, a polystyrene, a polyvinyl chloride, a polybutadiene, a polyisoprene, a polyvinyl butyral and a polyvinyl ether;

[10-7] The curable resin composition according to any one of [1] to [10-6], wherein the component (E) is at least one selected from the group consisting of an aliphatic polyamine, an alicyclic polyamine, an aromatic polyamine, a secondary amine, a tertiary amine, a polyamide amine, and a polyamide;

[10-8] The curable resin composition according to any one of [1] to [10-7], wherein the component (E) is at least one selected from the group consisting of piperidine, pyridine, benzyldimethylamine, 2-(dimethylaminomethyl)phenol, triethylenediamine, dimethylcyclohexylamine, dimethylbenzylamine, dimethylhexylamine, dimethylaminophenol, 2,4,6-tris(dimethylaminomethyl)phenol, dimethylamino p-cresol, piperidine, 1,4-diazadicyclo[2.2.2]octane, 2,4,6-tris(dimethylaminomethyl)phenol, and 1,8-diazabicyclo[5.4.0]undecene-1;

[10-9] The curable resin composition according to any one of [1] to [10-8], further comprising a filler as component (F), wherein the component (F) is at least one selected from the group consisting of talc, silica, clay, calcium carbonate, magnesium carbonate, calcium silicate, glass, alumina, zinc oxide, magnesium oxide, aluminum nitride, boron nitride, carbon, diamond, gold, silver, copper and nickel;

[10-10] The curable resin composition according to any one of [1] to [10-9], further comprising a filler as component (F), wherein the component (F) comprises a filler having a small average particle size of 0.01 μm or more and less than 5.0 μm and a filler having a large average particle size of 5.0 μm or more and 150 μm or less;

[10-11] The curable resin composition according to any one of [1] to [10-10], further comprising a silane coupling agent;

[10-12] The curable resin composition according to any one of [1] to [10-11], wherein the silane coupling agent is a silane coupling agent containing a vinyl group;

[10-13] The curable resin composition according to any one of [10-2] to [10-12], being a cold-curing resin composition;

[10-14] The curable resin composition according to any one of [10-2] to [10-13], being a two-component curable resin composition;

[10-15] The curable resin composition according to [10-14], wherein the two-component curable resin composition contains an agent A and an agent B, the agent A contains the components (A) to (C), the agent B contains the components (D) and (E);

[11] A cured product obtained by curing the curable resin composition according to any one of [1] to [10];

[11-2] A cured product obtained by curing the curable resin composition according to any one of [10-2] to [10-15].

Further, another embodiment of the present invention relates to the following [12]:

[12] A method for producing a curable resin composition, comprising mixing the following components (A) to (E):
  component (A): an epoxy resin having 2 or more epoxy groups in a molecule;
  component (B): a bismuth catalyst;
  component (C): water having a pH of 8.0 or more (i.e., water-containing liquid having a pH of 8.0 or more)
  component (D): an organic polymer having 2 or more hydrolyzable silyl groups in a molecule; and
  component (E): a curing agent for an epoxy resin.

Further, non-restrictive examples of the preferred embodiments of the present invention include the following embodiments according to the following [12-2 to 13-2]:

[12-2] The method for producing a curable resin composition according to [12], wherein the component (C) is an alkaline electrolyzed water;

[12-3] The method for producing a curable resin composition according to [12] or [12-2], wherein the component (C) is a water containing at least one or more compounds selected from the group consisting of sodium hydroxide, calcium hydroxide, potassium carbonate and sodium metasilicate;

[12-4] The method for producing a curable resin composition according to any one of [12] to [12-3], wherein the component (B) is bismuth carboxylate;

[12-5] The method for producing a curable resin composition according to any one of [12] to [12-4], wherein the composition comprises 0.05 to 30 parts by mass of the component (C) based on 100 parts by mass of the component (A);

[12-6] The method for producing a curable resin composition according to any one of [12] to [12-5], wherein the component (E) is an amine compound in a liquid state at 25° C.;

[12-7] The method for producing a curable resin composition according to any one of [12] to [12-6], the composition further comprising a filler as component (F);

[12-8] The method for producing a curable resin composition according to anyone of [12] to [12-7], the composition containing substantially no organic tin catalyst;

[12-9] The method for producing a curable resin composition according to any one of [12] to [12-8], wherein the component (A) is at least one selected from the group consisting of a bisphenol A epoxy resin, a bisphenol F epoxy resin, a bisphenol E epoxy resin, a diglycidyl ether of bisphenol A alkylene oxide adduct, a diglycidyl ether of bisphenol F alkylene oxide adduct, and a bisphenol E alkylene oxide adduct;

[12-10] The method for producing a curable resin composition according to any one of [12] to [12-9], wherein a hydrolyzable group included in the hydrolyzable silyl group is at least one selected from the group consisting of a halogen atom, an alkoxy group, an acyl oxide group, a ketoxymate group, an amino group, an amide group, an acid amide group, an aminooxy group, a mercapto group, and alkenyl oxide group;

[12-11] The method for producing a curable resin composition according to any one of [12] to [12-10], wherein the hydrolyzable silyl group is at least one selected from the group consisting of a trimethoxysilyl group, a triethoxysilyl group, a triisopropoxysilyl group, a triphenoxysilyl group, a methyldimethoxysilyl group, a methyldiethoxysilyl group, a dimethylmethoxysilyl group, and a dimethylethoxysilyl group;

[12-12] The method for producing a curable resin composition according to any one of [12] to [12-11], wherein the component (D) has at least one structure selected from the group consisting of a polyoxyalkylene, a polyester, a polycarbonate, a polyurethane, a polyamide, a polyurea, a polyimide, a polyethylene, a polypropylene, a polyisobutylene, a poly(meth)acrylate, a polystyrene, a polyvinyl chloride, a polybutadiene, a polyisoprene, a polyvinyl butyral and a polyvinyl ether;

[12-13] The method for producing a curable resin composition according to any one of [12] to [12-12], wherein the component (E) is at least one selected from the group consisting of an aliphatic polyamine, an alicyclic polyamine, an aromatic polyamine, a secondary amine, a tertiary amine, a polyamide amine, and a polyamide;

[12-14] The method for producing a curable resin composition according to any one of [12] to [12-13], wherein the component (E) is at least one selected from the group consisting of piperidine, pyridine, benzyldimethylamine, 2-(dimethylaminomethyl)phenol, triethylenediamine, dimethylcyclohexylamine, dimethylbenzylamine, dimethylhexylamine, dimethylaminophenol, 2,4,6-tris(dimethylaminomethyl)phenol, dimethylamino p-cresol, piperidine, 1,4-diazabicyclo[2.2.2]octane, 2,4,6-tris(dimethylaminomethyl)phenol, and 1,8-diazabicyclo[5.4.0]undecene-1;

[12-15] The method for producing a curable resin composition according to any one of [12] to [12-14], the composition further comprising a filler as component (F), wherein the component (F) is at least one selected from the group consisting of talc, silica, clay, calcium carbonate, magnesium carbonate, calcium silicate, glass, alumina, zinc oxide, magnesium oxide, aluminum nitride, boron nitride, carbon, diamond, gold, silver, copper and nickel;

[12-16] The method for producing a curable resin composition according to any one of [12] to [12-15], the composition further comprising a filler as component (F), wherein the component (F) comprises a filler having a small average particle size of 0.01 μm or more and less than 5.0 μm and a filler having a large average particle size of 5.0 μm or more and 150 μm or less;

[12-17] The method for producing a curable resin composition according to any one of [12] to [12-16], the composition further comprising a silane coupling agent;

[12-18] The method for producing a curable resin composition according to any one of [12] to [12-17], wherein the silane coupling agent is a silane coupling agent containing a vinyl group;

[12-19] The method for producing a curable resin composition according to any one of [12] to [12-18], wherein the composition is a cold-curing resin composition;

[12-20] The method for producing a curable resin composition according to any one of [12] to [12-19], wherein the composition is a two-component curable resin composition;

[12-21] The method for producing a curable resin composition according to [12-20], wherein the two-component curable resin composition contains an agent A and an agent B, the agent A contains the components (A) to (C), the agent B contains the components (D) and (E);

[13] A method for producing a cured product, comprising producing a curable resin composition by the method for producing a curable resin composition according to [12], and curing the curable resin composition;

[13-2] A method for producing a cured product, comprising producing a curable resin composition by the method for producing a curable resin composition according to any one of [12-2] to [12-21], and curing the curable resin composition.

DESCRIPTION OF EMBODIMENTS

In the present specification, "X to Y" means a range including the values described in the front and rear (X and Y) as a lower limit and an upper limit, respectively, implying "X or more and Y or less".

Unless otherwise specified, an operation and measurement of properties, etc., are performed under conditions at room temperature (20 to 25° C.) with a relative humidity of 40 to 50% RH.

In the present specification, "(meth)acrylate" is a collective term for an acrylate and a methacrylate. In a similar manner, for example, a compound including (meth) in the name such as (meth)acrylic acid is a collective term of a compound having "meth" in the name and a compound having no "meth" in the name.

An embodiment of the present invention relates to a curable resin composition containing the following components (A) to (E):
component (A): an epoxy resin having 2 or more epoxy groups in a molecule;
component (B): a bismuth catalyst;
component (C): water having a pH of 8.0 or more (i.e., water-containing liquid having a pH of 8.0 or more);
component (D): an organic polymer having 2 or more hydrolyzable silyl groups in a molecule; and
component (E): a curing agent for an epoxy resin.

Such a curable resin composition is excellent in surface curability and internal curability in bonding adherend members without use of an organic tin catalyst.

The detail of the invention is described as follows.
<Component (A)>
The curable resin composition in an embodiment of the present invention includes component (A): an epoxy resin having 2 or more epoxy groups in a molecule. The component (A) in the present invention is not particularly limited, as long as it is an epoxy resin having 2 or more epoxy groups in a molecule. The component (A) for use may include a single component or two or more types of components mixed. As the component (A), one in a liquid state at 25° C. is preferred from the viewpoint of workability.

In the present specification, the epoxy resin represents a curable epoxy compound that can form a resin through polymerization (curing). The curable epoxy compound may be any one of a monomer, an oligomer and a polymer.

The component (A) is not particularly limited, and examples thereof include a bisphenol A epoxy resin, a bisphenol F epoxy resin, a bisphenol E epoxy resin, a diglycidyl ether of bisphenol A alkylene oxide adduct, a diglycidyl ether of bisphenol F alkylene oxide adduct, a diglycidyl ether of bisphenol E alkylene oxide adduct, a hydrogenated bisphenol A epoxy resin, a hydrogenated bisphenol F epoxy resin, a hydrogenated bisphenol E epoxy resin, an epoxy resin having a glycidylamine skeleton, a cresol novolac epoxy resin, a phenol novolac epoxy resin, a hydrogenated cresol novolac epoxy resin, a hydrogenated phenol novolac epoxy resin, a resorcinol diglycidyl ether, an alicyclic epoxy resin, an aliphatic epoxy resin, and a urethane modified epoxy resin. Among these, a bisphenol A epoxy resin, a bisphenol F epoxy resin, a bisphenol E epoxy resin, a diglycidyl ether of bisphenol A alkylene oxide adduct, a diglycidyl ether of bisphenol F alkylene oxide adduct, and a diglycidyl ether of bisphenol E alkylene oxide adduct are preferably used from the viewpoints of good compatibility with component (D) described below and excellent surface curability and internal curability in bonding adherend members. Further, among these, a diglycidyl ether of bisphenol A alkylene oxide adduct is particularly preferred. These may be used singly, or in combinations of two or more thereof.

As the component (A), a commercial product or a synthesized product may be used. Examples of the commercial product of the component (A) include jER (registered trademark) series 825, 827, 828, 828EL, 828US, 828XA, 834, 806, 806H, 807, 604, 630, 871, YX8000, YX8034 and YX4000 (all the above manufactured by Mitsubishi Chemical Corporation), EPICLON (registered trademark) series 840, 840-S, 850, 850-S, 850-LC, EXA-850CRP, 830, 830-S, 835, EXA-830LVP, EXA-850CRP, 835LV, HP4032D, 703, 720, 726, HP820, N-660, N-680, N-695, N-655-EXP-S, N-665-EXP-S, N-685-EXP-S, N-740, N-775 and N-865 (all the above manufactured by DIC Corporation), Adekaresin (registered trademark) EP4100, EP4000, EP4080, EP4085, EP4088, EP4100HF, EP4901HF, EP4000S, EP4000L, EP4003S, EP4010S, EP4010L, EPU6, EPR4023, EPR1309 and EP49-20 (all the above manufactured by ADEKA Corporation), TEPIC(registered trademark), TEPIC(registered trademark)-S and TEPIC(registered trademark)-VL (all the above manufactured by Nissan Chemical Corporation), though not limited thereto. These may be used singly or a mixture of two or more thereof may be used.

The epoxy equivalent of the component (A) is preferably 50 to 5000 g/ep, more preferably 100 to 1000 g/ep, and particularly preferably 120 to 600 g/ep.

<Component (B)>

The curable resin composition in an embodiment of the present invention includes component (B): a bismuth catalyst.

The component (B) in the present invention is not particularly limited, as long as it is a bismuth catalyst. A silanol catalyst is a catalyst that allows a compound having a silanol group to cause a reaction. The silanol catalyst has an effect for causing a reaction of a silanol group obtained through hydrolysis of an organic polymer having 2 or more hydrolyzable silyl groups in a molecule as component (D) described below, a silane coupling agent as another component described below or the like. By selecting the component (B) of the present invention from among the silanol catalysts and combining with the other component of the present invention, an effect excellent in surface curability and internal curability in bonding adherend members can be obtained without use of an organic tin catalyst.

The component (B) is not particularly limited, and examples thereof include bismuth neodecanoate, bismuth carboxylate, bismuth benzoate, bismuth abietate, bismuth neoabiatate, and bismuth octylate. Among these, bismuth neodecanoate and bismuth carboxylate are preferred from the viewpoints of more excellent internal curability in bonding adherend members and more excellent adhesion to aluminum. Further, among these, bismuth carboxylate is particularly preferred. These may be used singly, or in combinations of two or more thereof.

As the component (B), a commercial product or a synthesized product may be used. The commercial product of the component (B) is not particularly limited, and examples thereof include Pucat (registered trademark) B7, Pucat (registered trademark) 25, and bismuth neodecanoate (all the above manufactured by Nippon Kagaku Sangyo Co., Ltd.), K-KAT (registered trademark) 348, K-KAT (registered trademark) XC-C227, K-KAT (registered trademark) XK-628, and K-KAT (registered trademark) XK-640 (all the above manufactured by King Industries, Inc.), Borchi (registered trademark) Kat 315, Borchi (registered trademark) Kat 320, and Borchi (registered trademark) Kat 24 (all the above manufactured by Borchers, Inc.).

The amount of the component (B) added is not particularly limited, and is preferably in the range of 0.01 to 50 parts by mass, more preferably 0.05 to 30 parts by mass, and particularly preferably 0.1 to 10 parts by mass, based on 100 parts by mass of the component (D). With the amount in the range, the furthermore excellent internal curability in bonding adherend members and furthermore excellent adhesion to aluminum can be achieved.

<Component (C)>

The curable resin composition in an embodiment of the present invention includes component (C): water having a pH of 8.0 or more (i.e., water-containing liquid having a pH of 8.0 or more). The component (C) in the present invention is not particularly limited, as long as it is a water having a pH of 8.0 or more (i.e., water-containing liquid having a pH of 8.0 or more). The component (C) in combination with the other component of the present invention can exhibit a remarkable effect excellent in surface curability and internal curability in bonding adherend members without use of an organic tin catalyst. In contrast, in the case of using water having a pH of less than 8.0 (i.e., water-containing liquid having a pH of less than 8.0) or in the case of using no water, poor results in surface curability and internal curability in bonding adherend members are obtained. Further, in comparison with the case of using the component (C) of the present invention, the adhesion tends to be lowered.

The pH of the component (C) is not particularly limited as long as it is 8.0 or more, being preferably 8.5 to 13.5, more preferably 9.0 to 13.3, and particularly preferably 9.5 to 13.0. The evaluation method of the pH of the component (C) is not particularly limited, and, for example, the value calculated by a glass electrode type hydrogen ion concentration indicator D-54 manufactured by Horiba Stec, Co., Ltd. may be used.

The water (water-containing liquid having a pH of 8.0 or more, or water as the raw material thereof) is not particularly limited, and, for example, distilled water, ion-exchanged water, tap water, alkaline electrolyzed water and the like may be used. These may be used singly, or in combinations of two or more thereof. Among these, use of alkaline electrolyzed water is preferred. Accordingly, in a preferred embodiment of the present invention, the component (C) is an alkaline electrolyzed water.

In the present specification, the alkaline electrolyzed water is an alkaline water obtained from the cathode side in electrolysis of water containing an electrolyte. Accordingly, the alkaline water obtained from the cathode side through electrolysis of water containing an electrolyte is an alkaline electrolyzed water. Further, the water obtained by diluting the alkaline water obtained from the cathode side through electrolysis of water containing an electrolyte with other water such as distilled water, ion-exchange water, and tap water is also regarded as an alkaline electrolyzed water. Further, the water obtained by electrolyzing water containing an electrolyte and removing the remaining electrolyte and ions generated from the electrolyte from the alkaline water obtained from the cathode side is also regarded as an alkaline electrolyzed water. Accordingly, examples of the alkaline electrolyzed water include water containing hydroxide ions generated from the cathode side through electrolysis of water, though not particularly limited. Further, examples of the alkaline electrolyzed water include water obtained by diluting the water containing hydroxide ions generated from the cathode side by electrolysis of water with pure water. Among these, water containing hydroxide ions generated from the cathode side through electrolysis of water is preferred.

The alkaline electrolysis water may include impurities or may contain no impurities resulting from removal thereof. Examples of the impurities include an electrolyte that is added in electrolysis for preparation of an alkaline electrolyzed water, ions generated from the electrolyte or the like, though not particularly limited. The electrolyte that is added in electrolysis for preparation of an alkaline electrolyzed water is not particularly limited, and a known electrolyte may be used. The preferred electrolyte is a component other than the component (A), the component (B), the component (D) and the component (E), which is a compound dissoluble in water, though not particularly limited. Examples of the other component include a component other than the component (A), the component (B), the component (D), the component (E) and the component (F). Further, examples of the component include a component other than the component (A), the component (B), the component (D), the component (E), the component (F), a silane coupling agent, various elastomers such as a styrene-based copolymer, a polythiol compound, a storage stabilizer, an antioxidant, a photo stabilizer, a heavy metal deactivator, a tackifier, a plasticizer, a defoaming agent, a dye, a pigment, a corrosion inhibitor, a levelling agent, a dispersant, a rheology controlling agent and a surfactant. Examples of the electrolyte included in the component (C) include a basic compound, though not particularly limited thereto. Examples thereof include sodium hydroxide, calcium hydroxide, potassium carbonate and sodium metasilicate.

Further, the component (C) may be water alone, or may be a liquid obtained by mixing water with another compound. Examples of the other compound to be mixed into the compound (C) include the same electrolytes described above, though not particularly limited. Further, the other compound included in the component (C) is not particularly limited and preferably a compound at least capable of producing water having a pH of 8.0 or more. Examples thereof include a basic compound, though not particularly limited. Examples thereof include sodium hydroxide, calcium hydroxide, potassium carbonate and sodium metasilicate.

Accordingly, examples of the component (C) in a preferred embodiment of the present invention include water containing an electrolyte. Further, examples of the component (C) in a more preferred embodiment of the present invention include water containing a basic compound. Further, examples of the component (C) in a still more preferred embodiment of the present invention include water containing at least one or more compound selected from the group consisting of sodium hydroxide, calcium hydroxide, potassium carbonate and sodium metasilicate.

The pH of the component (C) is not particularly limited, and can be adjusted, for example, with an electrolyte. The pH of the component (C) can be adjusted, for example, with a basic compound. The pH of the component (C) can be adjusted, for example, with sodium hydroxide, calcium hydroxide, potassium carbonate, or sodium metasilicate. In the case where the component (C) is an alkaline electrolyzed water, the pH of the component (C) can be adjusted, for example, by the type and amount of the electrolyte, electrolysis conditions and the like. Further, the pH of the component (C) can be adjusted, for example, by the amount of water (for example, pure water) added to the water obtained from the cathode side as a result of electrolysis. Further, in the case where the component (C) is a liquid obtained by mixing water with another compound, the pH of the component (C) can be adjusted, for example, by adding a basic compound to the water. Further, the pH of the component (C) can be adjusted by adding sodium hydroxide, calcium hydroxide, potassium carbonate, sodium metasilicate or the like to the water. On this occasion, preferred examples of the amount ratio between the water contained in the component (C) and the other compound added include a ratio that allows the mixture of the water and the other compound to have a pH of 8.0 or more, though not particularly limited.

As the component (C), a commercial product may be used, or a self-made one may be used. Alternatively, one prepared from commercial raw materials may be used. The commercial product of the component (C) or the raw material thereof is not particularly limited, and examples thereof include ThreeBond 6658 (manufactured by ThreeBond Co., Ltd.) and First Alkaline Water (manufactured by Daiichi Sangyo Co., Ltd.)

The amount of the component (C) added is not particularly limited, and is preferably 0.05 to 30 parts by mass, more preferably 0.1 to 20 parts by mass, and particularly preferably 0.3 to 10 parts by mass, based on 100 parts by mass of the component (D).

With the amount in the range, the more excellent surface curability and internal curability in bonding adherend members and more excellent adhesion to aluminum can be achieved.

The amount of the component (C) added is not particularly limited, and is preferably 0.05 to 30 parts by mass, more preferably 0.1 to 20 parts by mass, and particularly preferably 0.3 to 10 parts by mass, based on 100 parts by mass of the component (A). With the amount in the range, the more excellent surface curability and internal curability in bonding adherend members, and more excellent adhesion to aluminum can be achieved.

<Component (D)>

The curable resin composition in an embodiment of the present invention includes component (D): an organic polymer having 2 or more hydrolyzable silyl groups in a molecule. It is preferable that the component (D) of the present invention be an organic polymer having 2 or more hydrolyzable silyl groups in a molecule, allowing a cross-linking reaction to be initiated by moisture. The hydrolyzable silyl groups may be bonded to an end or a side chain of the organic polymer. From the viewpoint of more excellent internal curability in bonding adherend members, bonding to an end is preferred, and bonding to both ends is more preferred.

In the present specification, the hydrolyzable silyl group is a group having a silicon atom to which 1 to 3 hydrolyzable groups are bonded. The hydrolyzable group is not particularly limited, and preferred examples thereof include a halogen atom, an alkoxy group such as a methoxy group, an ethoxy group, a propyloxy group, an isopropyloxy group and a butoxy group, an acyl oxide group, a ketoxymate group, an amino group, an amide group, an acid amide group, an aminooxy group, a mercapto group, and alkenyl oxide group. Among these, an alkoxy group is preferred, and a methoxy group is particularly preferred, from the viewpoint of the more excellent internal curability in bonding adherend members and more excellent adhesion to aluminum.

The alkoxysilyl group having an alkoxy group bonded to a silicon atom is not particularly limited, and examples thereof include a trialkoxysilyl group such as a trimethoxysilyl group, a triethoxysilyl group, a triisopropoxysilyl group and a triphenoxysilyl group; a dialkoxysilyl group such as a methyldimethoxysilyl group and a methyldiethoxysilyl group; and a monoalkoxysilyl group such as a dimethylmethoxysilyl group and a dimethylethoxysilyl group. Among these, a dialkoxysilyl group and a trialkoxysilyl group are preferred, and a trialkoxysilyl group is more preferred, from the viewpoint of the more excellent internal curability in bonding adherend members and more excellent adhesion to aluminum. Among these, a trimethoxysilyl group is particularly preferred. These may be used singly, or in combinations of two or more thereof.

The organic polymer structure of the component (D) is not particularly limited, and examples thereof include the structure such as a polyoxyalkylene, a polyester, a polycarbonate, a polyurethane, a polyamide, a polyurea, a polyimide, a polyethylene, a polypropylene, a polyisobutylene, a poly (meth)acrylate, a polystyrene, a polyvinyl chloride, a polybutadiene, a polyisoprene, a polyvinyl butyral and a polyvinyl ether. Among these, a structure such as a polyoxyalkylene, a polyisobutylene, and a poly(meth)acrylate is preferred from the viewpoint of more excellent surface curability, and a structure such as a polyoxyalkylene and a poly(meth) acrylate is more preferred from the viewpoint of more excellent internal curability in bonding adherend members. Among these, a polyoxyalkylene is particularly preferred. As the component (D), polymers of these structures may be used singly, or a mixture of two or more thereof may be used. As the component (D), polymers having a plurality of structures may be used.

It is preferable that the component (D) be in a liquid state at 25° C. from the viewpoint of handling. Examples of the range of viscosity (25° C.) of the component (D) is not particularly limited, and is preferably 0.5 to 3000 Pa·s, more preferably 1 to 2000 Pa·s, and particularly preferably 3 to 1500 Pas. Within the range, a curable resin composition having furthermore excellent internal curability in bonding adherend members and more excellent workability can be obtained. Unless otherwise noted, in the measurement of viscosity, the viscosity at 25° C. is measured by using a cone plate viscometer in accordance with JIS K6833-1: 2008.

Accordingly, preferred examples of the component (D) include a polyoxyalkylene containing trimethoxysilyl groups at both ends. Further, more preferred examples of the component (D) include a polyoxyalkylene containing trimethoxysilyl groups at both ends having a viscosity (25° C.) of 0.5 to 3000 Pas (more preferably 1 to 2000 Pas, and still more preferably 3 to 1500 Pas).

As the component (D), a commercial product or a synthesized product may be used. Examples of a commercial product of the component (D) include Cyril (registered trademark) SAT010, SAX115, SAT030, SAT030, SAT200, SAT350, SAT400, SAX220, SAX510, SAX530, SAX580, SAX710, SAX720, SAX725, SAX770, MA440, MA447, MA451, MA903, MA903M, MA904, 5943, MAX923, MAX951, SAX520, OR100S, MS Polymer (registered trademark) 5203, 5303, S203H, S303H, S943S, S911S, XMAP (registered trademark) SA100S, SA310S, Epion (registered trademark) EP100S, EP103S, EP303S and EP505S (all the above manufactured by Kaneka Corporation), Excestar (registered trademark) ES-52410, ES-52420, ES-53430, ES-53610 and ES-53630 (all the above manufactured by AGC Inc.)

The amount of the component (D) added is preferably 30 to 300 parts by mass, more preferably 30 to 200 parts by mass, and particularly preferably 50 to 150 parts by mass, based on 100 parts by mass of the component (A). With the amount in the range, the furthermore excellent surface curability and internal curability in bonding adherend members, and furthermore excellent adhesion to aluminum can be achieved.

<Component (E)>

The curable resin composition in an embodiment of the present invention includes component (E): a curing agent for an epoxy resin. In other words, the component (E) of the present invention is a curing agent for an epoxy resin. Examples of the component (E) include an amine compound that is preferably in a liquid state at 25° C.

The component (E) is not particularly limited, and examples thereof include an aliphatic polyamine, an alicyclic polyamine, an aromatic polyamine, a secondary amine, a tertiary amine, a polyamide amine, and a polyamide. The amine compounds may be used singly or may be a mixture of two or more thereof.

The aliphatic polyamine is not particularly limited and examples thereof include ethylenediamine, diethylenetriamine, triethylenetetramine, and hexamethylenediamine. The alicyclic polyamine is not particularly limited and examples thereof include mensendiamine (MDA), isophoronediamine (IPDA), N-aminoethylpiperazine (N-AEP), diaminodicyclohexylmethane, and norbornanediamine (NBDA). The aromatic polyamine is not particularly limited, and examples thereof include metaxylylenediamine (MXDA), metaphenylenediamine, diaminodiphenylmethane, diaminodiphenylsulfone, and diaminodiethyldiphenylmethane.

The secondary amine and the tertiary amine are not particularly limited, and examples thereof include piperidine, pyridine, benzyldimethylamine, 2-(dimethylaminomethyl)phenol, triethylenediamine, dimethylcyclohexylamine, dimethylbenzylamine, dimethylhexylamine, dimethylaminophenol, 2,4,6-tris(dimethylaminomethyl) phenol, dimethylamino p-cresol, piperidine, 1,4-diazadicyclo[2.2.2]octane, 2,4,6-tris(dimethylaminomethyl)phenol, and 1,8-diazabicyclo[5.4.0]undecene-1.

As the component (E), a commercial product or a synthesized product may be used. Examples of a commercial product of the component (E) include Ancamine (registered trademark) series K-54 (manufactured by Air Products and Chemicals, Inc.), though not particularly limited.

The amount of the component (E) added is not particularly limited, and is preferably 1 to 300 parts by mass, more preferably 1 to 150 parts by mass, and particularly preferably 3 to 100 parts by mass, based on 100 parts by mass of the component (A). With the amount in the range, a curable resin composition having furthermore excellent internal curability in bonding adherend members and more excellent workability can be obtained.

<Component (F)>

It is preferable that the curable resin composition in an embodiment of the present invention include component (F): a filler. In other words, a filler as component (F) may be used further in the curable resin composition in an embodiment of the present invention within a range not impairing the object of the present invention. A conventional moisture curable resin composition with a large amount of filler added tends to have remarkably slow internal curability because water hardly permeates into the internal part of the moisture curable resin composition. In contrast, the curable resin composition in an embodiment of the present invention is excellent in the internal curability, so that a large amount of filler can be added to impart various functions.

The component (F) is not particularly limited, and examples thereof include talc, silica, clay, calcium carbonate, magnesium carbonate, calcium silicate, glass, alumina, zinc oxide, magnesium oxide, aluminum nitride, boron nitride, carbon, diamond, gold, silver, copper and nickel. Further, the component (F) may be surface treated. These may be used singly, or a mixture thereof may be used.

In order to impart a high modulus to the cured product of the curable resin composition, talc, silica, clay, calcium carbonate, magnesium carbonate, calcium silicate, and glass are preferred as component (F). In order to impart thermal conductivity to the curable resin composition, thermally conductive powder such as alumina, zinc oxide, magnesium oxide, aluminum nitride, boron nitride, carbon and diamond is preferred. In order to impart flame retardance to the curable resin composition, aluminum hydroxide is preferred. In order to impart electrical conductivity to the curable resin composition, an electrically conductive filler such as gold, silver, copper and nickel is preferred.

The average particle size (50% average particle size) of the component (F) is preferably 0.01 μm or more and 150 μm or less, more preferably 0.1 μm or more and 100 μm or less, and most preferably 0.5 μm or more and 70 μm or less, from the viewpoint of obtaining a curable resin composition excellent in the surface curability and internal curability in bonding adherend members. In the present invention, the average particle size is a particle size at cumulative 50% in the particle size distribution obtained, for example, by laser diffraction/scattering method (also referred to as D50).

As the component (F), a commercial product or a synthesized product may be used. Examples of a commercial product of the component (F) include low sodium alumina LA-210B (manufactured by Nippon Light Metal Co., Ltd.) and AO-509 (manufactured by Admatechs Co., Ltd.), though not particularly limited.

The content of the component (F) is not particularly limited, and, for example, is preferably 5 to 95 mass %, more preferably 10 to 90 mass %, and particularly preferably 20 to 85 mass %, relative to the total curable resin composition in an embodiment of the present invention. With the content of the component (F) in the range, a curable resin composition having furthermore excellent surface curability and internal curability in bonding adherend members can be obtained.

In the case of using the curable resin composition of the present invention as a thermally conductive resin composition, the content of the component (F) is not particularly limited, and, for example, is preferably 30 to 95 mass %, more preferably 40 to 90 mass %, and particularly preferably 50 to 85 mass %, relative to the total curable resin composition in an embodiment of the present invention.

In the case of using the curable resin composition in an embodiment of the present invention as a thermally conductive resin composition, it is preferable that two or more fillers having a different average particle size be used in combination to obtain a curable resin composition having low viscosity, excellent in thermal conductivity and internal curability in bonding adherend members. Specifically, the filler having a small average particle size is preferably in a range of 0.01 μm or more and less than 5.0 μm, and more preferably in a range of 0.1 μm or more and 3.5 μm of less. The filler having a large average particle size is preferably in a range of 5.0 μm or more and 150 μm or less, more preferably in a range of 6.0 μm or more and 100 μm or less, and most preferably in a range of 7.0 μm or more and 70 μm or less, from the viewpoint of obtaining a curable resin composition having low viscosity before curing and excellent thermal conductivity. The content of the filler having a large average particle size based on 100 parts by mass of the filler having a small average particle size is preferably 10 to 700 parts by mass, more preferably 20 to 600 parts by mass, and particularly preferably 30 to 500 parts by mass. With the amounts of the filler having a small average particle size and the filler having a large average particle size added in the range, a curable resin composition furthermore excellent in the surface curability and internal curability in bonding adherend members can be obtained.

<Other Additive>

In the curable resin composition in an embodiment of the present invention, other additives such as a silane coupling agent, various elastomers such as a styrene-based copolymer, a polythiol compound, a storage stabilizer, an antioxidant, a photo stabilizer, a heavy metal deactivator, a tackifier, a plasticizer, a defoaming agent, a dye, a pigment, a corrosion inhibitor, a levelling agent, a dispersant, a rheology controlling agent and a surfactant may be used in the range not impairing the object of the present invention. Among these, the curable resin composition in an embodiment of the present invention contains preferably a silane coupling agent, a storage stabilizer, or an antioxidant, and particularly preferably a silane coupling agent.

The silane coupling agent is not particularly limited, and examples thereof include an alkyl group-containing silane coupling agent such as dimethyldimethoxysilane, methyltrimethoxysilane, methyltriethoxysilane, dimethyldiethoxysilane and hexyltrimethoxysilane; a vinyl group-containing silane coupling agent such as vinyltrimethoxysilane and vinyltriethoxysilane; a phenyl group-containing silane coupling agent such as phenyltrimethoxysilane, diphenyldimethoxysilane and phenyltriethoxysilane; an amino group-containing silane coupling agent such as N-2-(aminoethyl)-3-aminopropyltrimethoxysilane, N-2-(aminoethyl)-3-aminopropylmethyldimethoxysilane, N-2-(aminoethyl)-3-aminopropylmethyltrimethoxysilane, N-2-(aminoethyl)-3-aminopropylmethyltriethoxysilane, 3-aminopropyltrimethoxysilane, 3-aminopropyltriethoxysilane and N-phenyl-3-aminopropyltrimethoxysilane; a glycidyl group-containing silane coupling agent such as 3-glycidoxypropylmethyldimethoxysilane, 3-glycidoxypropyltrimethoxysilane and 3-glycidoxysilyltriethoxysilane; (meth)acryloyl group-containing silane coupling agent such as 3-(meth)acryloxypropylmethyldimethoxysilane, 3-(meth)acryloxypropyltrimethoxysilane, 3-(meth)acryloxypropylmethyldiethoxysilane and 3-(meth)acryloxypropyltriethoxysilane; and others such as γ-mercaptopropyltrimethoxysilane, γ-chloropropyltrimethoxysilane, styrylsilane, ureidosilane, sulfide silane and isocyanate silane. Among these, an alkyl group-containing silane coupling agent, a phenyl group-containing silane coupling agent, a vinyl group-containing silane coupling agent and an amino group-containing silane coupling agent are preferred, and a vinyl group-containing silane coupling agent is more preferred to obtain a curable resin composition having more excellent surface curability and internal curability in bonding adherend members, while maintaining storage stability. Among these, vinyltrimethoxysilane is particularly preferred. These may be used singly, or in combinations of two or more thereof. The amount of the silane coupling agent added is not particularly limited, and, for example, in a range of preferably 0.05 to 100 parts by mass, more preferably 0.1 to 50 parts by mass, and particularly preferably 1 to 30 parts by mass, based on 100 parts by mass of the component (D) of the present invention. With an amount in the range, the curable resin composition has more excellent surface curability and internal curability in bonding adherend members, while maintaining storage stability.

To the curable resin composition in an embodiment of the present invention, an antioxidant may be added. Examples of the antioxidant include a quinone-based compound such as β-naphthoquinone, 2-methoxy-1,4-naphthoquinone, methylhydroquinone, hydroquinone, hydroquinone monomethyl ether, mono-tert-butylhydroquinone, 2,5-di-tert-butylhydroquinone, p-benzoquinone, 2,5-diphenyl-p-benzoquinone and 2,5-di-tert-butyl-p-benzoquinone; phenols such as phenothiazine, 2,2-methylene-bis(4-methyl-6-tert-butylphenol), catechol, tert-butylcatechol, 2-butyl-4-hydroxyanisole, 2,6-di-tert-butyl-p-cresol, 2-tert-butyl-6-(3-tert-butyl-2-hydroxy-5-methylbenzyl)-4-meth ylphenylacrylate, 2-[1-(2-hydroxy-3,5-di-tert-pentylphenyl)ethyl]-4,6-di-tert-p entylphenylacrylate, 4,4'-butylidenebis(6-tert-butyl-3-methylphenol), 4,4'-thiobis(6-tert-butyl-3-methylphenol), 3,9-bis [2-[3-(3-tert-butyl-4-hydroxy-5-methylphenyl)propionyl oxy]-1,1-dimethylethyl]-2,4,8,10-tetraoxaspiro[5,5]undecane, pentaerythritoltetrakis[3-(3,5-di-tert-butyl-4-hydroxyphenyl) propionate], thiodiethylenebis[3-(3,5-di-tert-butyl-4-hydroxyphenyl)propio nate], octadecyl-3-(3,5-di-tert-butyl-4-hydroxyphenyl)propionate, N,N'-hexane-1,6-diylbis[3-(3,5-di-tert-butyl-4-hydroxyphenyl) propionamide], benzenepropanoic acid, 3,5-bis(1,1-dimethylethyl)-4-hydroxy, C7-C9 side chain alkyl ester, 2,4-dimethyl-6-(1-methylpentadecyl)phenol, diethyl[[3,5-bis(1, 1-dimethylethyl)-4-hydroxyphenyl]methyl]ph osphonate, 3,3',3'',5,5',5''-hexa-tert-butyl-a,a',a''-(mesitylene-2,4,6-tol yl)tri-p-cresol, calcium diethylbis[[3,5-bis(1,1-dimethylethyl)-4-hydroxyphenyl]methyl]phosphonate, 4,6-bis(octylthiomethyl)-o-cresol, ethylenebis(oxyethylene)bis[3-(5-tert-butyl-4-hydroxy-m-tolyl) propionate], hexamethylenebis[3-(3,5-di-tert-butyl-4-hydroxyphenyl)propion ate], 1,3,5-tris (3,5-di-tert-butyl-4-hydroxybenzyl)-1,3,5-triazine-2,4,6-(1H,3H,5H)-trione, 1,3,5-tris[(4-tert-butyl-3-hydroxy-2,6-xylyl)methyl]-1,3,5-tr iazine-2,4,6(1H3H,5H)-trione, a reaction product of N-phenyl benzeneamine and 2,4,6-trimethylpentene, 2,6-di-tert-butyl-4-(4,6-bis(octylthio)-1,3,5-triazine-2-ylam ino)phenonl, picric acid and citric acid; a phosphorus-based compound such as tris(2,4-di-tert-butylphenyl)phosphite, tris[2-[[2,4,8,10-tetra-tert-butyldibenzo[d,f][1,3,2]dioxapho sphephine-6-yl]oxy] ethyl]amine, bis(2,4-di-tert-butylphenyl)pentaerythritol diphosphite, bis[2,4-bis(1,1-dimethylethyl)-6-methylphenyl]ethyl phosphite, tetrakis(2,4-di-tert-butylphenyl) [1,1-bisphenyl]-4,4'-diylbisphosphonite, and 6-[3-(3-tert-butyl-4-hydroxy-5-methylphenyl)propoxy]-2,4,8,10-tetra-tert-butyldibenz[d,f][1,3,2]dioxaphosphephine; dilauryl-3,3'-thiodipropionate, dimyristyl-3,3-thiodipropionate, distearyl-3,3'-thiodipropionate, pentaerythrityl tetrakis(3-laurylthiopropionate), a lactone-based compound; and a vitamin E-based compound. Among these, a phenol-based compound is preferred. These may be used singly, or in combinations of two or more thereof.

The storage stabilizer is not particularly limited, and examples thereof include silicate compounds such as ethyl silicate, propyl silicate and butyl silicate; and a borate such as triethyl borate, and tripropyl borate. These may be used singly, or in combinations of two or more thereof.

It is preferable that the curable resin composition in an embodiment of the present invention contain substantially no organic tin catalyst. In the present specification, "containing substantially no organic catalyst" means that the content of an organic tin catalyst is less than 0.1 mass % relative to the total mass of the curable resin composition. The lesser the content of an organic tin catalyst, the better. The content is preferably less than 0.01 mass %, more preferably less than 0.001 mass %, and most preferably no organic tin catalyst is contained.

<Production Method of Curable Resin Composition>

Another embodiment of the present invention relates to a method for producing a curable resin composition, comprising mixing the following components (A) to (E):

component (A): an epoxy resin having 2 or more epoxy resins in a molecule;

component (B): a bismuth catalyst;

component (C): water having a pH of 8.0 or more (i.e., water-containing liquid having a pH of 8.0 or more)

component (D): an organic polymer having 2 or more hydrolyzable silyl groups in a molecule; and component (E): a curing agent for an epoxy resin.

The details of the type, addition amount, properties, preferred aspects, etc. of the component (A) to (E) are the same as described above for the curable resin composition.

Further, the production method in an embodiment of the present invention may include mixing with another additive in addition to the components (A) to (E) described above. The details of the type, addition amount, properties, preferred aspects, etc. of the other component are the same as described above for the curable resin composition.

<Curing Method, Cured Product and Production Method Thereof>

It is preferable that the curable resin composition in an embodiment of the present invention be a cold-curing resin composition that can be cured by mixing two-components or by moisture under an environment at normal temperature (25° C.)

Further, it is preferable that the curable resin composition produced by the production method in an embodiment of the present invention be a cold-curing resin composition that can be cured by mixing two-components or by moisture under an environment at normal temperature (25° C.)

Further, curing of the curable resin composition in an embodiment of the present invention or the curable resin composition produced by the production method in an embodiment of the present invention can be accelerated by heating in a short time. The heating conditions are not particularly limited, and, for example, preferably at a temperature of 45 to 200° C., more preferably at a temperature of 50 to 170° C., and still more preferably at a temperature of 55 to 150° C.

A cured product obtained by curing the curable resin composition in an embodiment of the present invention is also in another embodiment of the present invention. Further, a method for producing a cured product, including producing a curable resin composition by the production method in an embodiment of the present invention, and curing the produced curable resin composition, is also in another embodiment of the present invention.

It is to be noted that curing by mixing two components means that curing can be performed by mixing two liquids when used.

<Two-Component Curable Resin Composition and Production Method Thereof>

It is preferable that the curable resin composition in an embodiment of the present invention be a two-component curable resin composition. The two-component curable resin composition is not particularly limited, and, for example, contains an agent A as a composition containing preferably the components (A) to (C), and an agent B as a composition containing preferably the component (D) and component (E). In other words, the curable resin composition in a preferred embodiment of the present invention is a two-component curable resin composition containing an agent A and an agent B, wherein the agent A contains the components (A) to (C), and the agent B contains the component (D) and the component (D).

Further, the production method in an embodiment of the present invention is preferably a production method of a two-component curable resin composition including a preparation step of liquid A including mixing the components (A) to (C), and a preparation step of liquid B including mixing the component (D) and the component (E).

By dividing the components into separate liquids as described above, useless reactions are more suppressed during storage, so that the storage stability can be more enhanced. The two liquids are mixed for use, so that quick curing is achieved.

Optional components such as the component (F) and a silane coupling agent may be contained in any one of the agent A and the agent B, or in both of them. In particular, the component (F) is contained preferably at least in the agent B, more preferably in the agent B only. Further, the silane coupling agent is contained preferably at least in the agent B, more preferably in the agent B only.

Further, the optional components such as the component (F) and a silane coupling agent may be mixed in the preparation step of one or both of the agent A and the agent B. In particular, the component (F) is mixed preferably at least in the preparation step of the agent B, more preferably in the preparation step of the agent B only. Further, the silane coupling agent is mixed preferably at least in the preparation step of the agent B, more preferably in the preparation step of the agent B only.

The agent B is in the range of preferably 0.1 to 1000 parts by mass, more preferably 1 to 900 parts by mass, still more preferably 5 to 800 parts by mass, and particularly preferably 10 to 700 parts by mass, based on 100 parts by mass of the agent A.

Further, it is particularly preferable that the cold-curing resin composition in an embodiment of the present invention and the cold-curing resin composition produced by the production method in an embodiment of the present invention be a two-component curable resin composition.

<Use>

The curable resin composition in an embodiment of the present invention and the curable resin composition produced by the production method in an embodiment of the present invention are excellent in surface curability and internal curability in bonding adherend members without use of an organic tin catalyst. Accordingly, the use of these curable resin compositions or cured products thereof are not particularly limited, and various examples of the preferable usage include an adhesive, an encapsulant, a sealant, a potting agent, a coating agent, a thermally conductive resin, a flame retardant resin, and an electrically conductive paste. These curable resin compositions or the cured products thereof are particularly suitably used as automobile parts, electrical or electronic parts, building material and the like. Further, the thermally conductive moisture curable composition (thermally conductive moisture curable resin composition) in an embodiment of the present invention, the thermally conductive moisture curable composition (thermally conductive moisture curable resin composition) produced by the production method in an embodiment of the present invention, or the cured product thereof may be used in various applications such as heat radiation of an electronic board; heat radiation of electronic equipment such as a mobile phone and a personal computer; heat radiation of lighting such as LED; heat radiation of a light pickup module; heat radiation of a camera module; heat radiation of a sensing device; heat radiation of a power semiconductor; heat radiation of an inverter for HEV, FCV or EV; heat radiation of a convertor for HEV, FCV or EV; and heat radiation of ECU parts for a battery pack, HEV, FCV or EV.

<Radiation Method>

Examples of the radiation method with use of the curable resin composition in an embodiment of the present invention, the curable resin composition produced by the production method in an embodiment of the present invention, or the cured product thereof include applying the thermally conductive moisture curable composition (thermally conductive moisture curable resin composition) in an embodiment of the present invention, or the thermally conductive moisture curable composition (thermally conductive moisture curable resin composition) produced by the production method in an embodiment of the present invention, to an electrical or electronic component so as to radiate the heat generated from the electrical or electronic component to the outside. Such an electrical or electronic component is not particularly limited, and examples thereof include an electronic board; a mobile phone; electronic equipment such as a personal computer; lighting equipment such as LED; a light pickup module; a camera module, a sensing device; a power semiconductor; an inverter for HEV, FCV or EV; a convertor for HEV, FCV or EV; and ECU parts for a battery pack, HEV, FCV or EV.

EXAMPLES

The present invention is described in more detail with reference to the following Examples, though the present invention is not limited to the Examples.

The testing methods that were used in Examples and Comparative Examples are as follows.

<Preparation of Agent a of Curable Resin Composition>

[Preparation of Agent A-1]

100 parts by mass of diglycidyl ether of bisphenol A alkylene oxide adduct in a liquid state at 25° C. (a1) (Adekaresin (registered trademark) EP4000, manufactured by ADEKA Corporation) (epoxy equivalent: 320 g/ep) as component (A), 4 parts by mass of bismuth carboxylate (b1) (K-KAT XK640, manufactured by King Industries, Inc.) as component (B), and 1 part by mass of alkaline electrolyzed water (alkaline electrolyzed water aqueous solution) at a pH of 12.7 (c1) (product name: ThreeBond 6658, manufactured by Three-Bond Co., Ltd.) as component (C)

were added and mixed at normal temperature (25° C.) with a mixer for 60 minutes to obtain an agent A-1.

[Preparation of Agent A-2]

An agent A-2 was obtained in the same manner as in preparation of the agent A-1, except that (c1) in the agent A-1 was replaced with alkaline electrolyzed water (alkaline electrolyzed water aqueous solution) at a pH of 10.0 (c2). The alkaline electrolyzed water at a pH of 10.0 was prepared as follows:

[Preparation of Alkaline Electrolyzed Water at a pH of 10.0]

To alkaline electrolyzed water (alkaline electrolyzed water aqueous solution) at a pH of 12.7 (product name: ThreeBond 6658, manufactured by ThreeBond Co., Ltd.), pure water (pH=7) (manufactured by ThreeBond Co., Ltd.) was added to prepare an alkaline electrolyzed water at a pH of 10.0.

[Preparation of Agent A-3]

An agent A-3 was obtained in the same manner as in preparation of the agent A-1, except that (c1) in the agent A-1 was replaced with water at a pH of 7.0 (c'1) (pure water manufactured by ThreeBond Co., Ltd.).

[Preparation of Agent A-4]

An agent A-4 was obtained in the same manner as in preparation of the agent A-1, except that (c1) in the agent A-1 was replaced with water at a pH of 2.5 (c'2) (product name: ThreeBond 6658C, manufactured by ThreeBond Co., Ltd.).

[Preparation of Agent A-5]

An agent A-5 was obtained in the same manner as in preparation of the agent A-1, except that (c1) in the agent A-1 was removed.

[Preparation of Agent A-6]

An agent A-6 was obtained in the same manner as in preparation of the agent A-1, except that (b1) in the agent A-1 was replaced with a zinc catalyst (b'1) (K-KAT 670, manufactured by King Industries, Inc.).

[Preparation of Agent A-7]

An agent A-7 was obtained in the same manner as in preparation of the agent A-1, except that (b1) in the agent A-1 was replaced with a chelate-based titanium catalyst (b'2) (TC-750 manufactured by Matsumoto Pharm. Ind. Co., Ltd.).

[Preparation of Agent A-8]

An agent A-8 was obtained in the same manner as in preparation of the agent A-1, except that (b1) in the agent A-1 was replaced with an organic tin catalyst (b'3) (Neostann (registered trademark) S-1, manufactured by Nitto Kasei Co., Ltd.).

<Preparation of Agent B of Curable Resin Composition>

[Preparation of Agent B-1]

100 parts by mass of polyoxyalkylene containing trimethoxysilyl groups at both ends having a viscosity (25° C.) of 7 Pas (d1) (Cyril (registered trademark) SAX530 manufactured by Kaneka Corporation) as component (D), 4 parts by mass of 2,4,6-tris(dimethylaminomethyl)phenol (e1) (in a liquid state at 25° C., Ancamine (registered trademark) K-54 manufactured by Air Products and Chemicals, Inc.) as component (E), and 2 parts by mass of vinyltrimethoxysilane as silane coupling agent were added and mixed at normal temperature (25° C.) with a mixer for 60 minutes to obtain an agent B-1.

The testing methods in Examples and Comparative Examples in the following Table 1 are as follows.

<(1) Tack-Free Time Testing>

As shown in the following Table 1, 105 parts by mass of the agent A and 112 parts by mass of the agent B of the curable resin composition were fed into a polyethylene container and mixed with a wooden stick for 10 minutes under an environment at 25° C. Subsequently, the curable resin composition after mixing was applied to a glass test piece to a thickness of 250 µm, and then left standing under an atmosphere at 25° C. and 55% RH. Then, the surface of the curable resin composition after mixing was touched with a wooden stick, and the time until reaching no stringy state of the curable resin composition after mixing was defined as "tack free time (minute)". The case where tack free time was unmeasurable within 600 minutes was described as "uncured". The tack free time is preferably within 350 minutes, and more preferably within 330 minutes. The results are shown in the following Table 1.

<(2) Tensile Shear Adhesive Strength to Aluminum>

[Preparation of Specimen]

As shown in the following Table 1, 105 parts by mass of the agent A and 112 parts by mass of the agent B of the curable resin composition were fed into a polyethylene container and mixed with a wooden stick for 10 minutes under an environment at 25° C. Subsequently, the curable resin composition after mixing in each of Examples and Comparative Examples was applied to a test piece made of aluminum (A1050P) having a width of 25 mm, a length of 100 mm, and a thickness of 1 mm. Then, another test piece made of aluminum (A1050P) was bonded to make an overlapped surface with dimensions of 25 mm by 10 mm, and was fixed with a clip. The overlapped surface has a structure in which the curable resin composition is present between the two test pieces made of aluminum. Then, the resultant was left to stand in an environment at 25° C. and 85% RH for 12 hours to make a specimen.

[Measurement of Tensile Shear Adhesive Strength]

The shear adhesive strength (unit: MPa) of the specimen was measured with a universal tensile tester (tension rate: 50 mm/min) at 25° C. in accordance with JIS K 6850: 1999. The shear adhesive strength is a value for the maximum strength. The results are shown in the following Table 1.

In the present invention, it is preferable that the shear adhesive strength to aluminum be 1.3 MPa or more.

<(3) Internal Curability after Bonding>

[Preparation of Specimen]

As shown in the following Table 1, 105 parts by mass of the agent A and 112 parts by mass of the agent B of the curable resin composition were fed into a polyethylene container and mixed with a wooden stick for 10 minutes under an environment at 25° C. Subsequently, the curable resin composition after mixing was applied to a glass plate (having a width of 150 mm, a length of 150 mm, and a thickness of 5 mm) with a polytetrafluoroethylene sheet attached to the surface. Then, another glass plate with a polytetrafluoroethylene sheet attached to the surface was bonded to make an overlapped surface with dimensions of 25 mm by 10 mm, and was fixed with a clip. The overlapped surface has a structure in which the curable resin composition is present between the two glass plates with a polytetrafluoroethylene sheet attached to the surface, so that each of the polytetrafluoroethylene sheets comes in contact with the curable resin composition. Then, the resultant was left to stand in an environment at 25° C. and 55% RH for 8 hours to make a specimen. In the bonding, between the adherends, a glass plate (glass plate as spacer (thickness: 0.5 mm)) was inserted to control a clearance to 0.5 mm.

[Checking of Internal Curability]

The glass test piece (glass plate with a polytetrafluoroethylene sheet attached to the surface) was peeled off from the specimen to check the state of a cured product present between the glass test pieces by visual observation. When a cured product uniformly formed was observed, the internal curability was evaluated as "accepted". When a composition in a liquid state remained in the central part and was not cured, the internal curability was evaluated as "rejected". The results are shown in the following Table 1.

TABLE 1

|  | Agent A | Agent B | Tack free time testing | Tensile shear adhesive strength to AL | Internal curability |
|---|---|---|---|---|---|
| Example 1 | Agent A-1 | Agent B-1 | 300 minutes | 1.40 MPa | Accepted |
| Example 2 | Agent A-2 | Agent B-1 | 305 minutes | 1.38 MPa | Accepted |
| Comparative Example 1 | Agent A-3 | Agent B-1 | 370 minutes | 1.02 MPa | Rejected |
| Comparative Example 2 | Agent A-4 | Agent B-1 | 380 minutes | 0.91 MPa | Rejected |
| Comparative Example 3 | Agent A-5 | Agent B-1 | Uncured | 0.02 MPa | Rejected |
| Comparative Example 4 | Agent A-6 | Agent B-1 | 480 minutes | 0.4 MPa | Rejected |
| Comparative Example 5 | Agent A-7 | Agent B-1 | 440 minutes | 0.68 MPa | Rejected |
| Comparative Example 6 | Agent A-8 | Agent B-1 | 360 minutes | 0.21 MPa | Rejected |

From the results in Examples 1 and 2 shown in the Table 1, it was confirmed that the curable resin composition of the present invention is excellent in surface curability, internal curability in bonding adherend members, and adhesion to aluminum without use of an organic tin catalyst.

On the other hand, it revealed that Comparative Examples 1 and 2 shown in the Table 1 that are the curable resin compositions with use of water different from the component (C) of the present invention has poor surface curability, poor internal curability in bonding adherend members, and poor adhesion to aluminum in comparison with the results in Example 1 of the present invention.

Further, it was revealed that Comparative Example 3 that is the curable resin composition not containing the component (C) of the present invention has very poor surface curability, very poor adhesion to aluminum, and very poor internal curability in bonding adherend members.

Further, it was revealed that Comparative Examples 4 to 6 that are the curable resin compositions with use of a catalyst different from the component (B) of the present invention have poor surface curability, poor adhesion to aluminum, and poor internal curability in bonding adherend members. In particular, it was surprisingly revealed that the curable resin composition in Example 1 with use of the component (B) of the present invention is superior in internal curability in bonding adherend members, and adhesion to aluminum in comparison with the curable resin compositions in Comparative Example 6 that is the curable resin composition with use of an organic tin catalyst known as a silanol catalyst having high activity.

Subsequently, a curable resin composition with a large amount of thermally conductive powder added was evaluated.

<Preparation of Agent B of Curable Resin Composition>

[Preparation of Agent B-2]

An agent B-2 was obtained in the same manner as in preparation of the agent B-1, except that 120 parts by mass of alumina powder having an average particle size of 3 μm (f1) (low sodium alumina LS-210B, manufactured by Nippon Light Metal Co., Ltd.) and 280 parts by mass of alumina powder having an average particle size of 10 μm (f2) (AO-509 manufactured by Admatechs Co., Ltd.) were further contained as component (F) in the agent B-1.

<(4) Initial Curability Test after Mixing>

As shown in the following Table 2, 105 parts by mass of the agent A and 512 parts by mass of the agent B of the curable resin composition were fed into a polyethylene container and mixed with a wooden stick for 10 minutes under an environment at 25° C. Subsequently, the curable resin composition after mixing was applied to a glass test piece to a thickness of 250 μm, and then left standing under an atmosphere at 25° C. and 55% RH for 600 minutes. Then, the surface of the curable resin composition after mixing was touched with a wooden stick to evaluate the state of curing. The results are shown in the following Table 2.

<(5) Tensile Shear Adhesive Strength to Aluminum>

[Preparation of Specimen]

As shown in the following Table 2, 105 parts by mass of the agent A and 512 parts by mass of the agent B of the curable resin composition were fed into a polyethylene container and mixed with a wooden stick for 10 minutes under an environment at 25° C. Subsequently, the curable resin composition after mixing in each of Examples and Comparative Examples shown in the following Table 2 was applied to a test piece made of aluminum (A1050P) having a width of 25 mm, a length of 100 mm, and a thickness of 1 mm. Then, another test piece made of aluminum (A1050P) was bonded to make an overlapped surface with dimensions of 25 mm by 10 mm, and was fixed with a clip. Then, the resultant was left to stand in an environment at 25° C. for 60 hours to make a specimen.

[Measurement of Tensile Shear Adhesive Strength]

The shear adhesive strength (unit: MPa) of the specimen was measured with a universal tensile tester (tension rate: 50 mm/min) at 25° C. in accordance with JIS K 6850: 1999. The shear adhesive strength is a value for the maximum strength. The results are shown in the following Table 2.

In the present invention, it is preferable that the shear adhesive strength to aluminum be 1.3 MPa or more.

TABLE 2

|  | Example 3 | Comparative Example 7 |
|---|---|---|
| Agent A | Agent A-1 | Agent A-5 |
| Agent B | Agent B-2 | Agent B-2 |
| Initial curability test after mixing | Cured | Uncured |
| Tensile shear adhesive strength to Aluminum | 1.61 MPa | 1.28 MPa |

Based on the results in Example 3 shown in the Table 2, it was confirmed that even the curable resin composition with a large amount of filler added of the present invention is excellent in the surface curability and adhesion to aluminum without use of an organic tin catalyst.

On the other hand, it was revealed that Comparative Example 7 that is the curable resin composition not containing the component (C) of the present invention has very poor surface curability and very poor adhesion to aluminum.

Next, in order to confirm that the curable resin composition in Example 3 is thermally conductive, the thermal conductivity was measured.

<(6) Measurement of Thermal Conductivity>

The curable resin composition in Example 3 described in the following Table 2 was applied to an aluminum (A1050P) plate having a width of 25 mm, a length of 100 mm and a thickness of 1 mm to a thickness of 2.0 mm, and then left standing under an environment at 25° C. and 50% RH for 7 days to be cured for making a specimen. The measurement of thermal conductivity (W/m·k) was performed at 25° C. using a thermal conductivity meter (QTM-500 manufactured by Kyoto Electronics Industry Co., Ltd.). The larger the thermal conductivity, the better, because heat is easily transferred. In particular, in the present invention, it is preferable that the thermal conductivity be 1.0 W/(m·k) or more. The measurement results showed that the curable resin composition in Example 3 has a thermal conductivity of 1.5 W/(m·k), which confirms having a good thermal conductivity.

INDUSTRIAL APPLICABILITY

The curable resin composition in an embodiment of the present invention or the curable resin composition produced by the production method in an embodiment of the present invention is excellent in surface curability, internal curability in bonding adherend members, and adhesion to aluminum without use of an organic tin catalyst, being suitably used in various applications such as an adhesive, an encapsulant, a sealant, a potting agent, a coating agent, a thermally conductive resin, a flame retardant resin and an electrically conductive paste. The curable resin composition is industrially useful due to applicability to a wide variety of fields.

The present application is based on Japanese Patent Application No. 2019-223576 filed on Dec. 11, 2019, the disclosed matter of which is incorporated in its entirety by reference.

The invention claimed is:

1. A curable resin composition comprising the following components (A) to (E):
   component (A): an epoxy resin having 2 or more epoxy groups in a molecule;
   component (B): a bismuth catalyst;
   component (C): an alkaline electrolyzed water having a pH of 8.0 or more, or
      a water having the pH of 8.0 or more and containing at least one or more compounds selected from the group consisting of sodium hydroxide, calcium hydroxide, potassium carbonate, and sodium metasilicate;
   component (D): an organic polymer having 2 or more hydrolyzable silyl groups in a molecule; and
   component (E): a curing agent for an epoxy resin.

2. The curable resin composition according to claim 1, wherein the component (C) is the alkaline electrolyzed water having the pH of 8.0 or more.

3. The curable resin composition according to claim 1, wherein the component (C) is the water having the pH of 8.0 or more and containing the at least one or more compounds.

4. The curable resin composition according to claim 1, wherein the component (B) is bismuth carboxylate.

5. The curable resin composition according to claim 1, comprising 0.05 to 30 parts by mass of the component (C) based on 100 parts by mass of the component (A).

6. The curable resin composition according to claim 1, wherein the component (E) is an amine compound in a liquid state at 25° C.

7. The curable resin composition according to claim 1, further comprising a filler as component (F).

8. The curable resin composition according to claim 1, being a cold-curing resin composition.

9. The curable resin composition according to claim 1, being a two-component curable resin composition.

10. The curable resin composition according to claim 9, wherein the two-component curable resin composition contains an agent A and an agent B, the agent A contains the components (A) to (C), and the agent B contains the components (D) and (E).

11. A cured product obtained by curing the curable resin composition according to claim 1.

12. A method for producing a curable resin composition, comprising mixing the following components (A) to (E):
   component (A): an epoxy resin having 2 or more epoxy groups in a molecule;
   component (B): a bismuth catalyst;
   component (C): an alkaline electrolyzed water having a pH of 8.0 or more, or
      a water having the pH of 8.0 or more and containing at least one or more compounds selected from the group consisting of sodium hydroxide, calcium hydroxide, potassium carbonate and sodium metasilicate;
   component (D): an organic polymer having 2 or more hydrolyzable silyl groups in a molecule; and
   component (E): a curing agent for an epoxy resin.

13. A method for producing a cured product, comprising producing a curable resin composition by the method for producing a curable resin composition according to claim 12, and curing the curable resin composition.

14. The curable resin composition according to claim 1, wherein the alkaline electrolyzed water having the pH of 8.0 or more contains at least one or more compounds selected from the group consisting of sodium hydroxide, calcium hydroxide, potassium carbonate, and sodium metasilicate.

15. The curable resin composition according to claim 1, wherein the pH of the component (C) is in a range from 9.0 or more to 13.3 or less.

16. The curable resin composition according to claim 1, wherein the pH of the component (C) is in a range from 9.5 or more to 13.0 or less.

17. The curable resin composition according to claim 7, wherein the filler contains alumina.

18. The curable resin composition according to claim 1, further comprising component (F),
   wherein the component (F) contains a first filler and a second filler,
   wherein the first filler and the second filler are alumina;
   an content of the component (F) is 30 to 95 mass % relative to a total mass of the curable resin composition;
   the first filler and the second filler have different average particle sizes,
   the first filler has a smaller average particle size in a range from 0.01 μm or more to less than 5.0 μm, and the second filler has a larger average particle size in a range from 5.0 μm or more to 150 μm or less; and
   a content of the second filler is 10 to 700 parts by mass with respect to 100 parts by mass of the first filler.

19. The curable resin composition according to claim 17, wherein the curable resin composition has a thermal conductivity of 1.0 W/(m·k) or more.

20. The method according to claim 12, wherein the component (C) is the alkaline electrolyzed water having the pH of 8.0 or more.

* * * * *